US012282348B2

(12) United States Patent
Sumitomo

(10) Patent No.: US 12,282,348 B2
(45) Date of Patent: Apr. 22, 2025

(54) LINEAR POWER SUPPLY CIRCUIT INCLUDING A CURRENT AMPLIFIER TO AMPLIFY OUTPUT CURRENT AND VEHICLE INCLUDING THE SAME

(71) Applicant: Rohm Co., Ltd., Kyoto (JP)

(72) Inventor: Hironori Sumitomo, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 261 days.

(21) Appl. No.: 18/081,064

(22) Filed: Dec. 14, 2022

(65) Prior Publication Data

US 2023/0195152 A1 Jun. 22, 2023

(30) Foreign Application Priority Data

Dec. 17, 2021 (JP) ................................. 2021204764

(51) Int. Cl.

*G05F 1/575* (2006.01)
*G05F 1/565* (2006.01)
*G05F 3/26* (2006.01)

(52) U.S. Cl.

CPC .............. *G05F 1/575* (2013.01); *G05F 1/565* (2013.01); *G05F 3/262* (2013.01)

(58) Field of Classification Search

CPC ................................. G05F 1/565; G05F 1/575
See application file for complete search history.

(56) References Cited

U.S. PATENT DOCUMENTS

2005/0184711 A1* 8/2005 Chen ........................ G05F 1/575 323/280
2020/0133323 A1* 4/2020 Takobe .................... B60R 16/03
2020/0133324 A1* 4/2020 Nagata ..................... B60R 16/03
2020/0244160 A1* 7/2020 Mitev ...................... G05F 1/565
2021/0116952 A1* 4/2021 Nagata ..................... G05F 1/575
2022/0011799 A1* 1/2022 Nagata ................ H03F 3/45179
2022/0043471 A1* 2/2022 Guiraud .................. G05F 1/575
2022/0075404 A1* 3/2022 Nagata ................ H03F 3/45475

FOREIGN PATENT DOCUMENTS

DE 102021117102 A1 * 1/2022 ............. B60R 16/03
EP 3848772 A2 * 7/2021 ............. G05F 1/561
JP 2012053580 A * 3/2012
JP 2020-071681 5/2020
JP 2020071710 A * 5/2020
WO WO-2020090551 A1 * 5/2020 ............. B60R 16/03
WO WO-2020090616 A1 * 5/2020 ............. B60R 16/03
WO WO-2020209369 A1 * 10/2020 ................ B60L 1/00

* cited by examiner

*Primary Examiner* — Sisay G Tiku
(74) *Attorney, Agent, or Firm* — Fish & Richardson P.C.

(57) ABSTRACT

A linear power supply circuit includes: an error amplifier configured to output an error signal according to a difference between a feedback voltage based on an output voltage and a reference voltage; a first transistor configured to be controlled by the error signal; a current mirror circuit; a bias current source configured to distribute and supply a bias current to the first transistor and the current mirror circuit; a current amplifier configured to amplify a current outputted from the current mirror circuit; and a compensator configured to compensate for the bias current by a current corresponding to the current outputted from the current amplifier.

7 Claims, 7 Drawing Sheets

LINEAR POWER SUPPLY CIRCUIT INCLUDING A CURRENT AMPLIFIER TO AMPLIFY OUTPUT CURRENT AND VEHICLE INCLUDING THE SAME

CROSS-REFERENCE TO RELATED APPLICATION

This application is based upon and claims the benefit of priority from Japanese Patent Application No. 2021-204764, filed on Dec. 17, 2021, the entire contents of which are incorporated herein by reference.

TECHNICAL FIELD

The present disclosure relates to a linear power supply circuit and a vehicle provided with the linear power supply circuit.

BACKGROUND

A linear power supply circuit such as an LDO (low drop-out) circuit or the like is used as a power supply means for various devices. The technique related to the linear power supply circuit is known in the art.

In a low-power-consumption linear power supply circuit, if a phase is secured, a gain may not be increased very much when an output capacitor has a small capacity or when a load is heavy. If the gain cannot be increased, the load regulation characteristics of the linear power supply circuit deteriorate.

SUMMARY

According to one embodiment of the present disclosure, a linear power supply circuit includes: an error amplifier configured to output an error signal according to a difference between a feedback voltage based on an output voltage and a reference voltage; a first transistor configured to be controlled by the error signal; a current mirror circuit; a bias current source configured to distribute and supply a bias current to the first transistor and the current mirror circuit; a current amplifier configured to amplify a current outputted from the current mirror circuit; and a compensator configured to compensate for the bias current by a current corresponding to the current outputted from the current amplifier.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In this specification, the term "reference voltage" refers to a voltage that is constant in an ideal state, and refers to a voltage that may fluctuate slightly due to a change in temperature or the like in reality.

In this specification, the term "constant current" refers to a current that is constant in an ideal state, and refers to a current that may fluctuate slightly due to a change in temperature or the like in reality.

In this specification, the term "MOSFET (metal-oxide-semiconductor field-effect transistor)" refers to a field effect transistor whose gate structure consists of at least three layers of a "layer made of a conductor or a semiconductor such as polysilicon having a low resistance value," an "insulating layer," and a "P-type, N-type, or intrinsic semiconductor layer." That is, the gate structure of the MOSFET is not limited to a three-layer structure of a metal, an oxide, and a semiconductor.

Figure 1:
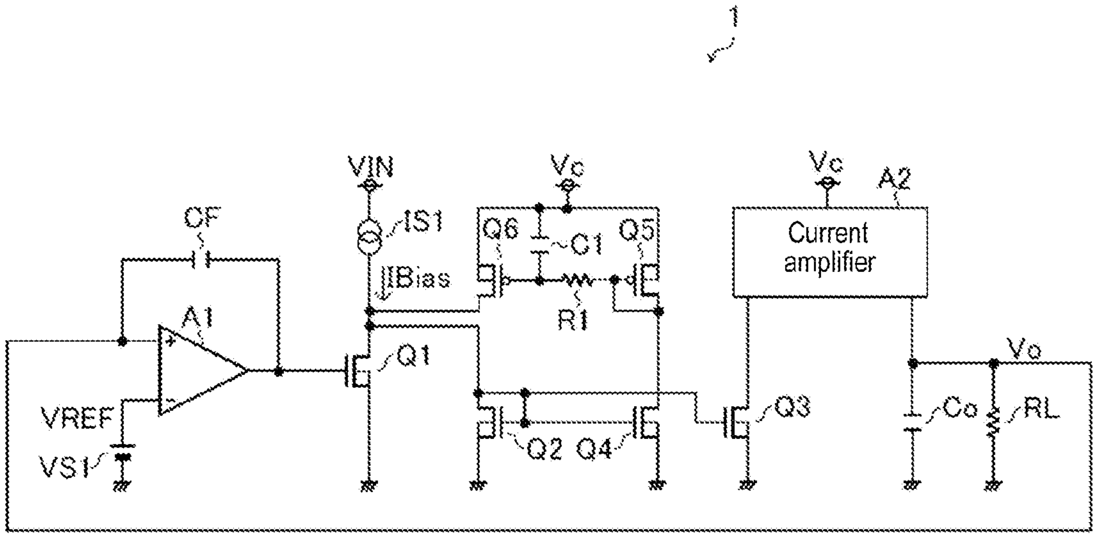
FIG. 1 is a diagram showing a configuration example of a linear power supply circuit according to an embodiment.

FIG. 1 is a diagram showing a configuration example of a linear power supply circuit according to an embodiment. The linear power supply circuit 1 shown in FIG. 1 includes an error amplifier A1, first to sixth transistors Q1 to Q6, a bias current source IS1, a current amplifier A2, a capacitor C1, a resistor R1, a bypass capacitor CF, and a reference voltage source VS1. An output capacitor Co and a load RL are externally connected to the linear power supply circuit 1.

The linear power supply circuit 1 converts an input voltage VIN into an output voltage Vo, and supplies the output voltage Vo to the output capacitor Co and the load RL.

A feedback voltage based on the output voltage Vo is supplied to a non-inverting input terminal of the error amplifier A1. A reference voltage VREF outputted from the reference voltage source VS1 is supplied to an inverting input terminal of the error amplifier A1. The error amplifier A1 outputs an error signal corresponding to the difference between the feedback voltage and the reference voltage VREF. In the configuration example shown in FIG. 1, the feedback voltage is the same as the output voltage Vo. Unlike the configuration example shown in FIG. 1, the feedback voltage may be a divided voltage of the output voltage Vo.

It is desirable that a gain of the error amplifier A1 is 1.

The feedback voltage is supplied to a first terminal of the bypass capacitor CF. A second terminal of the bypass capacitor CF is connected to an output terminal of the error amplifier A1.

The first transistor Q1 is controlled by the error signal outputted from the error amplifier A1. In the configuration example shown in FIG. 1, an N-channel MOSFET is used as the first transistor Q1.

An input voltage VIN is supplied to a first terminal of the bias current source IS1. A second terminal of the bias current source IS1 is connected to a drain of the first transistor Q1. A bias current IBias is outputted from the second terminal of the bias current source IS1. The bias current IBias is a constant current. A source of the first transistor Q1 is connected to a ground potential. By reducing the bias current IBias, the power consumption of the linear power supply circuit 1 can be reduced.

The bias current IBias is distributed and supplied to the first transistor Q1 and a current sink type current mirror circuit including the second transistor Q2 and the third transistor Q3. In the configuration example shown in FIG. 1, an N-channel MOSFET is used as the second transistor Q2, and an N-channel MOSFET is used as the third transistor Q3. The gate and drain of the second transistor Q2 and the gate of the third transistor Q3 are connected to the drain of the first transistor Q1. Each of the sources of the second transistor Q2 and the third transistor Q3 is connected to the ground potential.

The current amplifier A2 amplifies the current outputted from the current sink type current mirror circuit including the second transistor Q2 and the third transistor Q3. The current amplifier A2 is driven by a constant voltage Vc. The current outputted from the current amplifier A2 is supplied to the output capacitor Co and the load RL.

Figure 2:
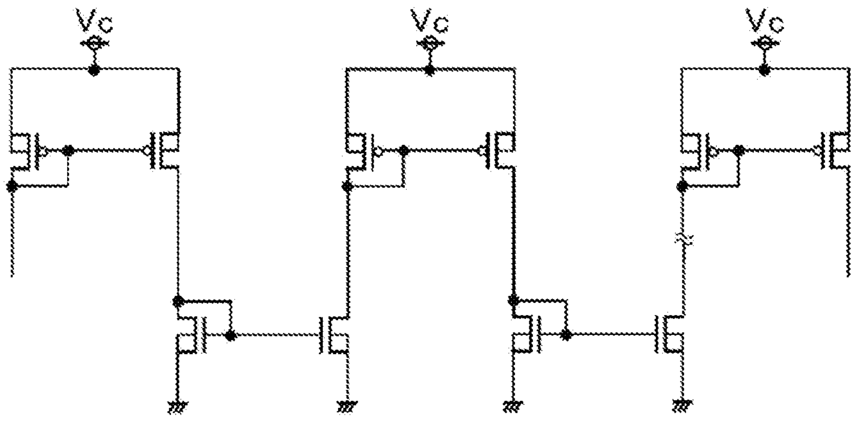
FIG. 2 is a diagram showing a configuration example of a current amplifier.

FIG. 2 is a diagram showing a configuration example of the current amplifier A2. The current amplifier A2 of the configuration example shown in FIG. 2 includes a plurality of current source type current mirror circuits and a plurality of current sink type current mirror circuits. The current source type current mirror circuits and the current sink type current mirror circuits are alternately arranged from an input to an output of the current amplifier A2.

Figure 3:
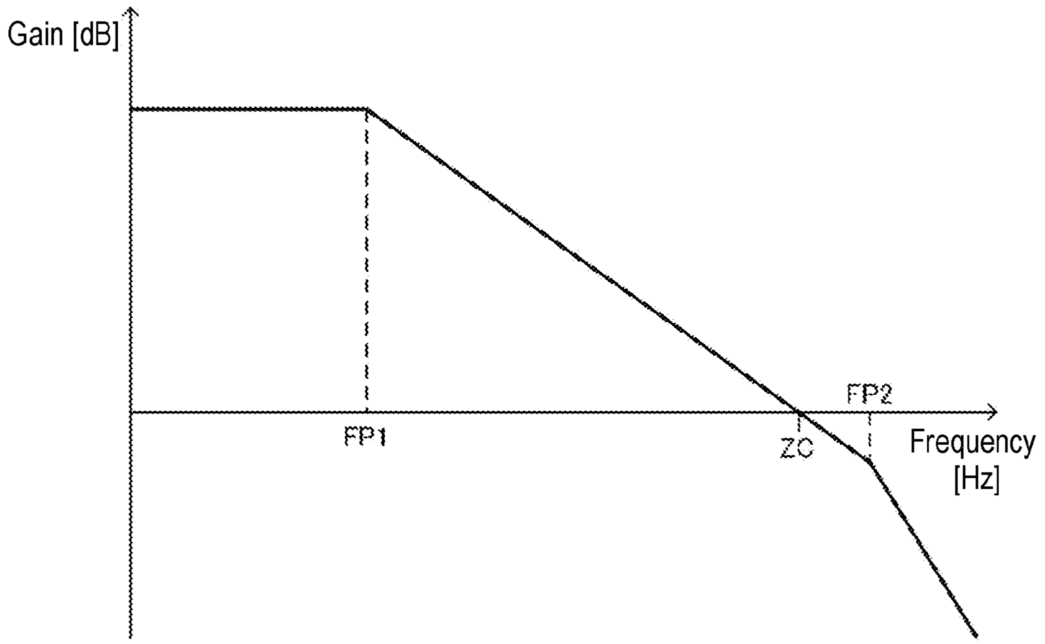
FIG. 3 is a diagram showing a gain characteristic of a transfer function of parts other than a compensator part in the linear power supply circuit, an output capacitor, and a load.

FIG. 3 is a diagram showing a gain characteristic of a transfer function of the parts other than a compensator in the linear power supply circuit 1, the output capacitor Co, and the load RL. The compensator includes the fourth to sixth transistors, a capacitor C1, and a resistor R1. Details of the compensator part will be described later.

A first pole frequency FP1 is determined by a capacitance value of the output capacitor Co and the resistance value of the load RL. As the capacitance value of the output capacitor Co decreases, the first pole frequency FP1 increases and comes close to a second pole frequency FP2. Further, as the resistance value of the load RL increases, the first pole frequency FP1 increases and comes close to the second pole frequency FP2.

The second pole frequency FP2 is determined by the specific circuit configuration of the current amplifier A2. Since there are various restrictions on the specific circuit configuration of the current amplifier A2, the second pole frequency FP2 has an upper limit.

Further, the slope of the gain from the first pole frequency FP1 to the second pole frequency FP2 is theoretically constant.

Figure 4:
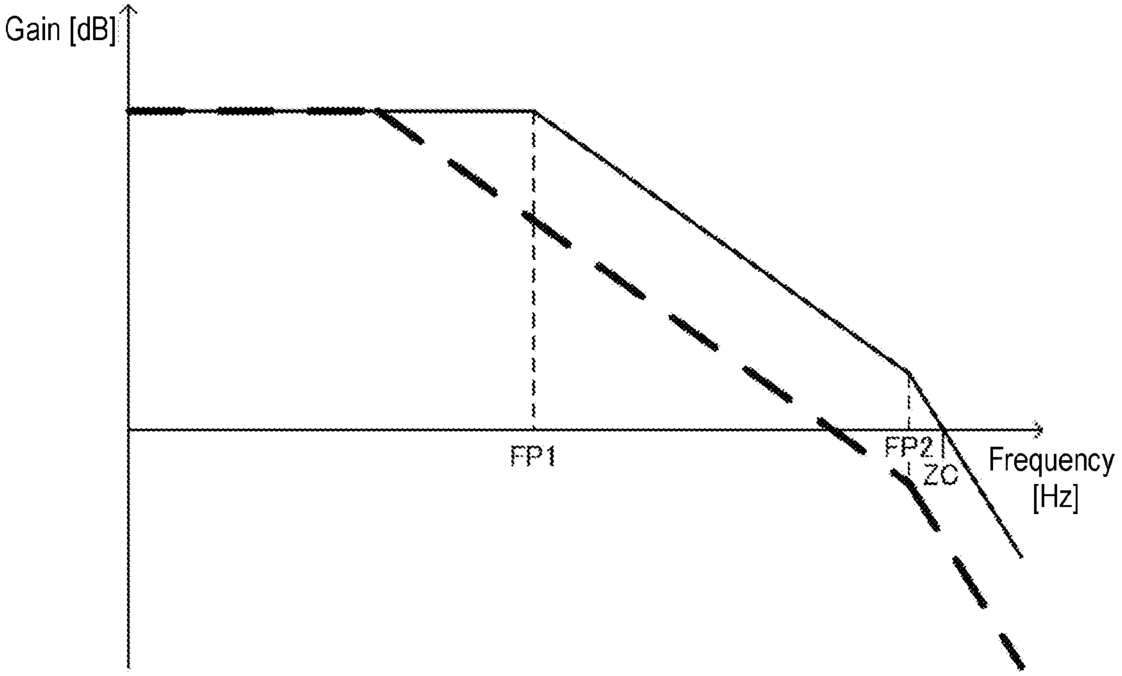
FIG. 4 is a diagram showing another gain characteristic of a transfer function of parts other than a compensator in the linear power supply circuit, an output capacitor, and a load.

Therefore, if the capacitance value of the output capacitor Co is small, when the resistance value of the load RL is large, or if the capacitance value of the output capacitor Co is small and the resistance value of the load RL is large, the first pole frequency FP1 comes close to the second pole frequency FP2. As a result, as shown in FIG. 4, the second pole frequency FP2 may become a frequency lower than the zero-cross frequency ZC. The thick dotted line in FIG. 4 indicates the gain characteristic shown in FIG. 3.

Figure 5:
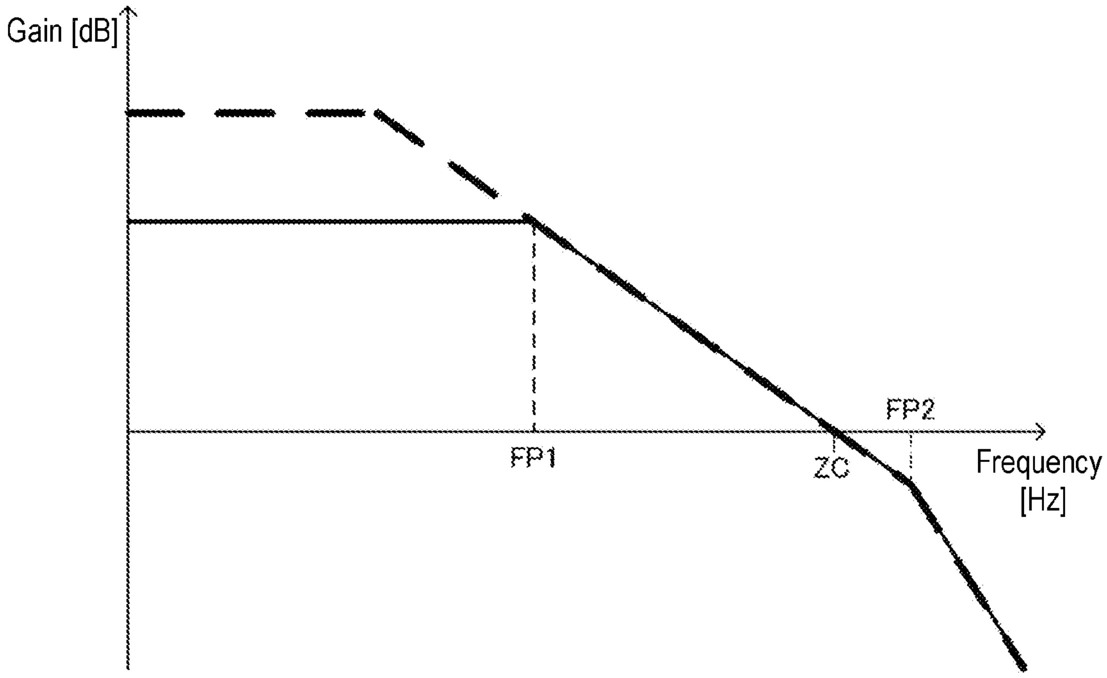
FIG. 5 is a diagram showing yet another gain characteristic of a transfer function of parts other than a compensator part in the linear power supply circuit, an output capacitor, and a load.

In order to secure the phase of the linear power supply circuit 1 and stably operate the linear power supply circuit 1, the second pole frequency FP2 needs to be higher than the zero-cross frequency ZC. Therefore, if the capacitance value of the output capacitor Co is small, if the resistance value of the load RL is large, or when the capacitance value of the output capacitor Co is small and the resistance value of the load RL is large, the gain needs to be lowered as shown in FIG. 5 to make the second pole frequency FP2 higher than the zero-cross frequency ZC. However, if the gain is lowered as shown in FIG. 5, the load regulation characteristic is deteriorated. The thick dotted line in FIG. 5 indicates the gain characteristic shown in FIG. 3.

The linear power supply circuit 1 includes a compensator that compensates for the bias current IBias with a current corresponding to the current outputted from the current amplifier A2, thereby improving the load regulation characteristic.

In the configuration example shown in FIG. 1, the compensator includes the fourth to sixth transistors Q4 to Q6, a capacitor C1, and a resistor R1. The compensator is driven by a constant voltage Vc. In the configuration example shown in FIG. 1, an N-channel MOSFET is used as the fourth transistor Q4, a P-channel MOSFET is used as the fifth transistor Q5, and a P-channel MOSFET is used as the sixth transistor Q6.

The gate of the fourth transistor Q4 is commonly connected to the gates of the second transistor Q2 and the third transistor Q3. The source of the fourth transistor Q4 is connected to the ground potential. Therefore, the drain current of the fourth transistor Q4 becomes a value dependent on the drain current of the second transistor Q2. Since the output current of the linear power supply circuit 1 is a value dependent on the drain current of the second transistor Q2, the drain current of the fourth transistor Q4 becomes a current corresponding to the output current of the linear power supply circuit 1. By providing the fourth transistor Q4, the current is returned to the bias current source IS1 side from a position close to the bias current source IS1, so that the compensator can be made compact.

The drain and gate of the fifth transistor Q5 are connected to the drain of the fourth transistor Q4. A constant voltage Vc is applied to the source of the fifth transistor Q5, the first terminal of the capacitor C1, and the source of the sixth transistor Q6. The drain and gate of the fifth transistor Q5 are connected to the second end of the capacitor C1 and the gate of the sixth transistor Q6 via the resistor R1. The drain of the sixth transistor Q6 is connected to the drain of the first transistor.

The fifth transistor Q5 and the sixth transistor Q6 constitute a current source type current mirror circuit in a range equal to or lower than a predetermined frequency determined by the time constant of a CR circuit including the capacitor C1 and the resistor R1. Therefore, in the range equal to or lower than the predetermined frequency, the compensator compensates for the bias current IBias by the drain current of the sixth transistor Q6. On the other hand, in a frequency range higher than the predetermined frequency, the sixth transistor Q6 is turned off by the capacitor C1. Therefore, the compensator part does not compensate for the bias current IBias.

Figure 6:
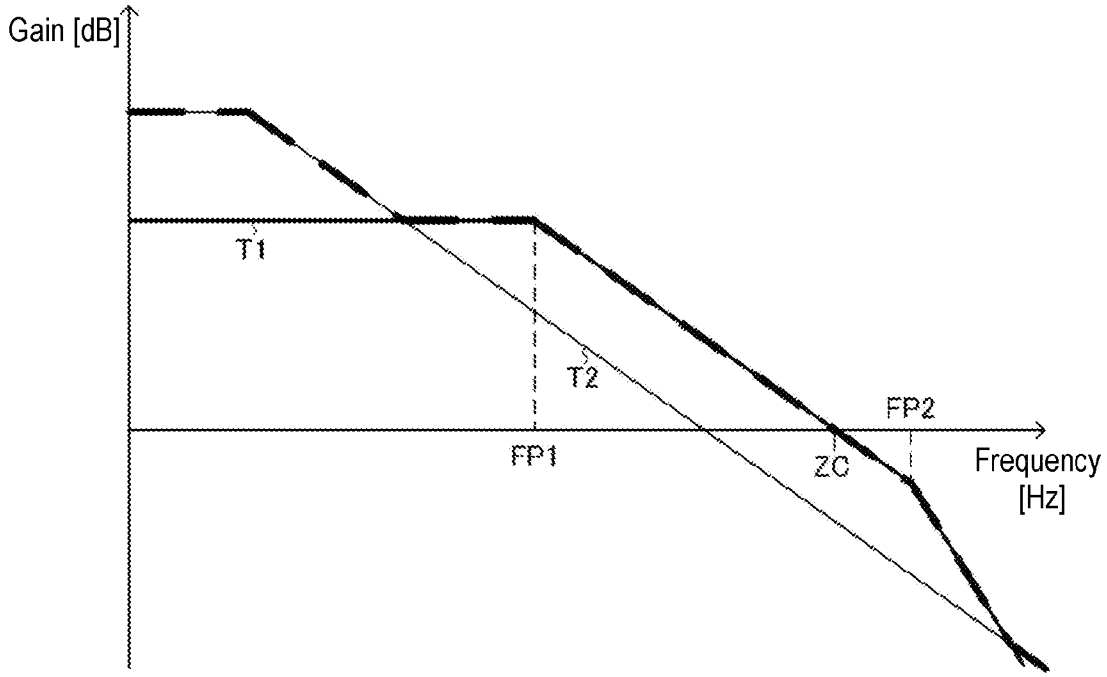
FIG. 6 is a diagram showing still another gain characteristic of a transfer function of the linear power supply circuit, an output capacitor, and a load.

FIG. 6 is a diagram showing a gain characteristic of a transfer function of the linear power supply circuit 1, the output capacitor Co, and the load RL.

FIG. 6 shows a gain characteristic T1 of the transfer function of the parts other than the compensator in the linear power supply circuit 1, the output capacitor Co, and the load RL, and a gain characteristic T2 of the transfer function of the compensator part of the linear power supply circuit 1.

In the gain path, the compensator part of the linear power supply circuit 1 is added in parallel to the parts of the linear power supply circuit 1 other than the compensator. Therefore, the gain characteristic of the transfer function of the linear power supply circuit 1, the output capacitor Co, and the load RL becomes an envelope curve (indicated by the thick dotted line in FIG. 6) that selects the gain characteristic T1 or the gain characteristic T2 whichever is higher.

Since the bias current IBias is compensated by the compensator part in the range equal to or lower than the predetermined frequency, the gain increases. This makes it possible to improve the load regulation characteristic.

Figure 7:
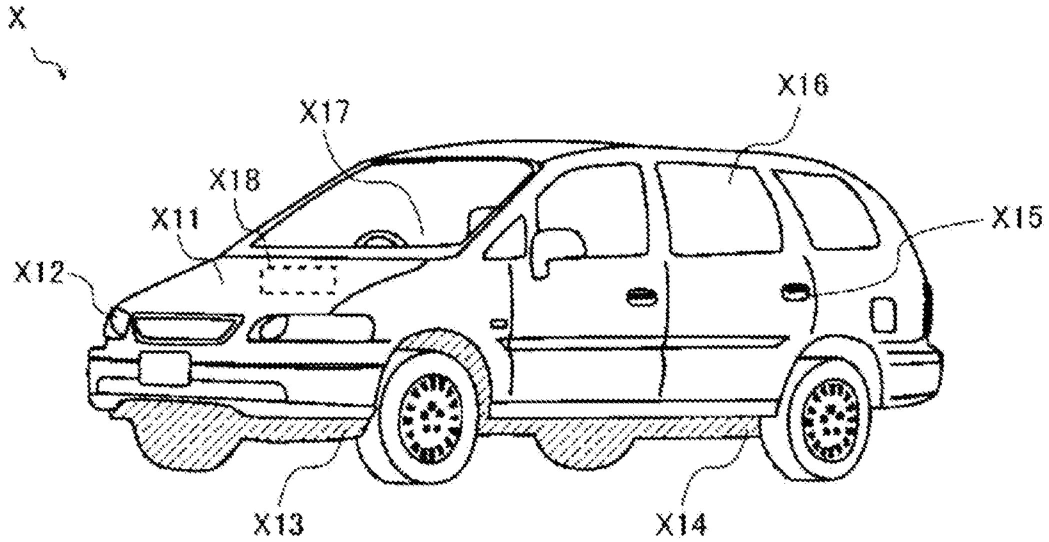
FIG. 7 is an external view of a vehicle.

FIG. 7 is an external view of a vehicle X. The vehicle X of this configuration example is equipped with various electronic devices X11 to X18 that operate by receiving a voltage supplied from a battery (not shown). For the sake of convenience of illustration, the mounting positions of the electronic devices X11 to X18 in this figure may differ from the actual ones.

The electronic device X11 is an engine control unit that performs engine-related control (injection control, electronic throttle control, idling control, oxygen sensor control, heater control, auto-cruise control, etc.).

The electronic device X12 is a lamp control unit that controls lighting and extinguishing of an HID (high intensity discharged lamp) and a DRL (daytime running lamp).

The electronic device X13 is a transmission control unit that performs control related to a transmission.

The electronic device X14 is a braking unit that performs control related to the motion of the vehicle X (ABS (anti-lock brake system) control, EPS (electric power steering) control, electronic suspension control, etc.).

The electronic device X15 is a security control unit that performs drive control of a door lock, a security alarm, and the like.

The electronic device X16 is an electronic device built into the vehicle X at the factory shipment stage as standard equipment or manufacturer option, such as a wiper, an electric door mirror, a power window, a damper (shock absorber), an electric sunroof, an electric seat, or the like.

The electronic device X17 is an electronic device arbitrarily mounted on the vehicle X as a user option, such as an in-vehicle A/V (audio/visual) device, a car navigation system, and an ETC (electronic toll collection system).

The electronic device X18 is an electronic device provided with a high withstand voltage motor, such as an in-vehicle blower, an oil pump, a water pump, a battery cooling fan, or the like.

The linear power supply circuit described above may be incorporated in any of the electronic devices X11 to X18.

OTHERS

The above-described embodiment is exemplary in all respects and not limitative. The technical scope of the present disclosure described herein is defined by the claims and not by the above description of the embodiment. It should be understood that all modifications within the meaning and scope of equivalents of the claims are included in the technical scope of the present disclosure.

For example, a bipolar transistor may be used instead of the MOSFET used in the above-described embodiment.

The linear power supply circuit described above comprises: an error amplifier (A1) configured to output an error signal according to a difference between a feedback voltage based on an output voltage and a reference voltage; a first transistor (Q1) configured to be controlled by the error signal; a current mirror circuit (Q2 and Q3); a bias current source (IS1) configured to distribute and supply a bias current to the first transistor and the current mirror circuit; a current amplifier (A2) configured to amplify a current outputted from the current mirror circuit; and a compensator (Q4 to Q6, C1 and R1) configured to compensate for the bias current by a current corresponding to the current outputted from the current amplifier (First Configuration).

The linear power supply circuit of the First Configuration can achieve both low power consumption and good load regulation characteristics by reducing the bias current.

In the linear power supply circuit of the First Configuration, the compensator may compensate for the bias current in a range equal to or lower than a predetermined frequency (Second Configuration).

The linear power supply circuit of the Second Configuration can improve load regulation characteristics without the compensator affecting a first pole frequency and a second pole frequency.

In the linear power supply circuit of the Second Configuration, the compensator may include a CR circuit including a capacitor (C1) and a resistor (R1) (Third Configuration).

According to the linear power supply circuit of the Third Configuration, the frequency range for compensating the bias current can be adjusted by the time constant of the CR circuit.

In the linear power supply circuit of the Third Configuration, the current mirror circuit may include a second transistor (Q2) and a third transistor (Q3), and the compensator may include a fourth transistor (Q4) having a control terminal commonly connected to control terminals of the second transistor and the third transistor (Fourth Configuration).

According to the linear power supply circuit of the Fourth Configuration, the compensator can have a compact configuration.

In the linear power supply circuit of the Fourth Configuration, the compensator may include a current source type current mirror circuit (Q5 and Q6) configured to supply a current to each of a connection node between the first transistor and the current mirror circuit and the fourth transistor (Fifth Configuration).

The linear power supply circuit of the Fifth Configuration can realize the compensator with a simple configuration.

In the linear power supply circuit of the Fifth Configuration, the CR circuit may be provided between control terminals of the fifth transistor (Q5) and the sixth transistor (Q6) that constitute the current mirror circuit (Sixth Configuration).

The linear power supply circuit of the Sixth Configuration can realize the compensator with a simple configuration.

In the linear power supply circuit of any one of the First to Sixth Configurations, the error amplifier may have a gain equal to 1 (Seventh Configuration).

The linear power supply circuit of any one of the First to Seventh Configurations may further comprise: a bypass capacitor, wherein the bypass capacitor may be configured such that the feedback voltage is supplied to a first terminal of the bypass capacitor and the output terminal of the error amplifier is connected to a second terminal of the bypass capacitor (Eighth Configuration).

In the linear power supply circuit of any one of the First to Eighth Configurations, the current mirror circuit may be a current sink type current mirror circuit (Ninth Configuration).

The vehicle described above comprises: the linear power supply circuit of any one of the First to Ninth Configurations (Tenth Configuration).

The vehicle of the Tenth Configuration can achieve both low power consumption and good load regulation characteristics.

According to the present disclosure in some embodiments, it is possible to achieve both low power consumption and good load regulation characteristics in a linear power supply circuit.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A linear power supply circuit, comprising:

an error amplifier configured to output an error signal according to a difference between a feedback voltage based on an output voltage and a reference voltage;

a first transistor configured to be controlled by the error signal;

a current mirror circuit;

a bias current source configured to distribute and supply a bias current to the first transistor and the current mirror circuit;

a current amplifier configured to amplify a current outputted from the current mirror circuit; and a compensator configured to compensate for the bias current by applying a current corresponding to the current outputted from the current amplifier, wherein the compensator is configured to compensate for the bias current in a range equal to or lower than a predetermined frequency, wherein the compensator includes a capacitor-resistor (CR) circuit, wherein the CR circuit comprises a capacitor and a resistor, wherein the current mirror circuit comprises a second transistor and a third transistor, and wherein the compensator comprises a fourth transistor having a control terminal commonly connected to control terminals of the second transistor and the third transistor.

2. The linear power supply circuit of claim 1, wherein the compensator includes a current source type current mirror circuit configured to supply a current to each of a connection node between the first transistor and the current mirror circuit, and the fourth transistor.

3. The linear power supply circuit of claim 2, wherein the CR circuit is provided between control terminals of a fifth transistor and a sixth transistor that constitute the current mirror circuit.

4. The linear power supply circuit of claim 1, wherein the error amplifier has a gain equal to 1.

5. The linear power supply circuit of claim 1, further comprising:

a bypass capacitor, wherein the bypass capacitor is configured such that the feedback voltage is supplied to a first terminal of the bypass capacitor and an output terminal of the error amplifier is connected to a second terminal of the bypass capacitor.

6. The linear power supply circuit of claim 1, wherein the current mirror circuit is a current sink type current mirror circuit.

7. A vehicle, comprising:

the linear power supply circuit of claim 1.

* * * * *